(12) United States Patent
Su et al.

(10) Patent No.: US 12,314,667 B2
(45) Date of Patent: May 27, 2025

(54) INTELLIGENT TOPIC SEGMENTATION WITHIN A COMMUNICATION SESSION

(71) Applicant: Zoom Communications, Inc., San Jose, CA (US)

(72) Inventors: Peng Su, Shoreline, WA (US); Ling Tsou, Los Angeles, CA (US); Junqing Wang, Zhejiang (CN); Tong Wang, Lexington, MA (US)

(73) Assignee: Zoom Communications, Inc., San Jose, CA (US)

( * ) Notice: Subject to any disclaimer, the term of this patent is extended or adjusted under 35 U.S.C. 154(b) by 302 days.

(21) Appl. No.: 17/719,314

(22) Filed: Apr. 12, 2022

(65) Prior Publication Data

US 2023/0237270 A1    Jul. 27, 2023
US 2024/0054289 A9    Feb. 15, 2024

(30) Foreign Application Priority Data

Jan. 20, 2022  (CN) .......................... 202220204221.0

(51) Int. Cl.
*G06F 40/295*    (2020.01)
*G06F 40/205*    (2020.01)
(Continued)

(52) U.S. Cl.
CPC .......... *G06F 40/295* (2020.01); *G06F 40/205* (2020.01); *G06F 40/40* (2020.01); *G06N 20/00* (2019.01); *H04L 12/1831* (2013.01)

(58) Field of Classification Search
CPC ...... G06F 40/295; G06F 40/40; G06F 40/205; G06N 20/00; H04L 12/1831
(Continued)

(56) References Cited

U.S. PATENT DOCUMENTS 8,990,234 B1 *  3/2015  Myslinski ............... G06N 5/047
                                                                707/758
10,455,297 B1 * 10/2019  Mahyar ............... H04N 21/4532
(Continued)

FOREIGN PATENT DOCUMENTS

WO    2020222935 A1    11/2020

OTHER PUBLICATIONS

International Search Report and Written Opinion mailed on Apr. 4, 2023 in corresponding PCT Application No. PCT/US2023/011243.

*Primary Examiner* — Tsu-Chang Lee
(74) *Attorney, Agent, or Firm* — Young Basile Hanlon & MacFarlane, P.C.

(57) ABSTRACT

Methods and systems provide for providing intelligent topic segmentation within a communication session. In one embodiment, the system connects to a communication session with a number of participants; receives a transcript of a conversation between the participants produced during the communication session, the transcript including timestamps for a number of utterances associated with speaking participants; shifts a window over the utterances to generate blocks of utterances; for each shift of the window over one utterance, identifies topic model ("TM") clusters (hereinafter "TM clusters") and generates TM cluster scores to assign text labels for each cluster; aggregates the scores for the TM clusters to generate a number of utterance level scores; converts the utterance level scores into topic segments each including a start time, end time, and associated text label; and transmits, to one or more client devices, a list of the topic segments for the communication session.

20 Claims, 6 Drawing Sheets

(51) Int. Cl.
   *G06F 40/40*   (2020.01)
   *G06N 20/00*   (2019.01)
   *H04L 12/18*   (2006.01)

(58) Field of Classification Search
   USPC .......................................................... 704/9
   See application file for complete search history.

(56) References Cited

U.S. PATENT DOCUMENTS

| | | | |
|---|---|---|---|
| 10,965,812 | B1 | 3/2021 | Das et al. |
| 11,176,949 | B2 | 11/2021 | Adlersberg et al. |
| 2012/0054184 | A1* | 3/2012 | Masud ................. G06F 16/285 |
| | | | 707/E17.091 |
| 2014/0257687 | A1* | 9/2014 | Chen ...................... G06T 11/20 |
| | | | 345/441 |
| 2018/0341632 | A1* | 11/2018 | Akkiraju ................ G06F 40/30 |
| 2020/0279019 | A1* | 9/2020 | Peterson ................ G06F 16/35 |
| 2020/0394269 | A1* | 12/2020 | Seibel ................... G06F 40/284 |
| 2021/0027783 | A1 | 1/2021 | Szymanski et al. |
| 2021/0201144 | A1* | 7/2021 | Jonnalagadda .......... G06N 3/08 |
| 2022/0075945 | A1* | 3/2022 | Zhang ................... G06F 40/295 |
| 2022/0086393 | A1* | 3/2022 | Peters ................... G06V 20/41 |
| 2022/0343079 | A1* | 10/2022 | Bhattacharya .......... G06F 40/30 |
| 2022/0382982 | A1* | 12/2022 | Orbach ............... G06F 16/2468 |
| 2022/0414338 | A1* | 12/2022 | Cho ....................... G06F 40/35 |

\* cited by examiner

INTELLIGENT TOPIC SEGMENTATION WITHIN A COMMUNICATION SESSION

FIELD OF INVENTION

The present invention relates generally to digital communication, and more particularly, to systems and methods for providing intelligent topic segmentation within a communication session.

SUMMARY

The appended claims may serve as a summary of this application.

BRIEF DESCRIPTION OF THE DRAWINGS

The present invention relates generally to digital communication, and more particularly, to systems and methods providing for providing intelligent topic segmentation within a communication session.

The present disclosure will become better understood from the detailed description and the drawings, wherein.

DETAILED DESCRIPTION

Figure 1A:
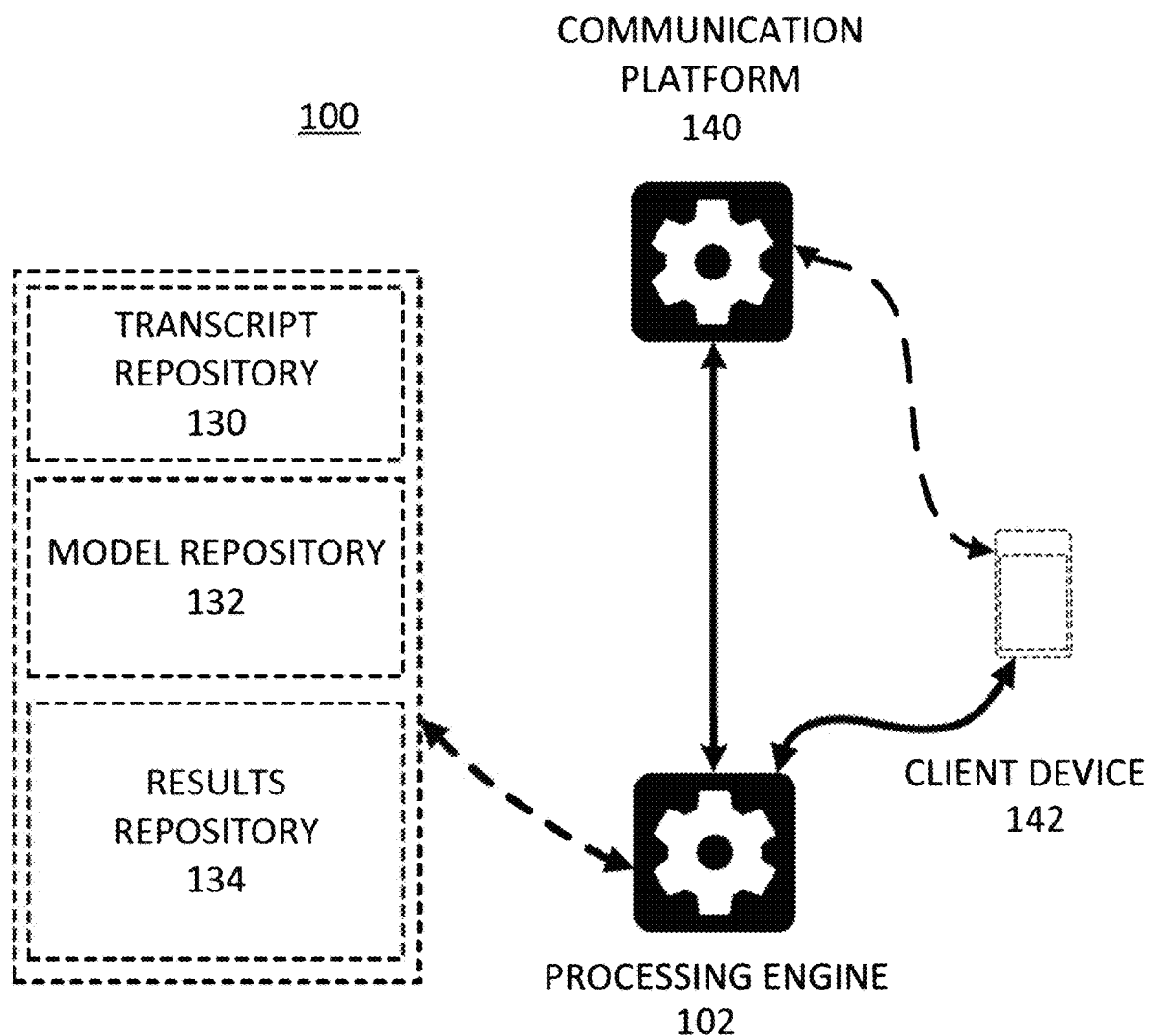
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

Particularly, when navigating through recorded video of a communication session, reviewing a sales meeting can be difficult and time consuming, as sales meeting can often run for 30-60 minutes, and a large amount of time is often spent on scrolling through the meeting to find the portion or topic the user is looking for. Additionally, past sales meetings can be difficult to search for, as there is no way to search for specific topics of discussion for specific prospective customers.

Thus, there is a need in the field of digital communication tools and platforms to create a new and useful system and method for providing intelligent topic segmentation within a communication session. The source of the problem, as discovered by the inventors, is a lack of ability to divide a meeting into topic segments based on the content of the meeting.

In one embodiment, the system connects to a communication session with a number of participants; receives a transcript of a conversation between the participants produced during the communication session, the transcript including timestamps for a number of utterances associated with speaking participants; shifts a window over the utterances to generate blocks of utterances; for each shift of the window over one utterance, identifies topic model ("TM") clusters (hereinafter "TM clusters") and generates TM cluster scores to assign text labels for each cluster; aggregates the scores for the TM clusters to generate a number of utterance level scores; converts the utterance level scores into topic segments each including a start time, end time, and associated text label; and transmits, to one or more client devices, a list of the topic segments for the communication session.

In some embodiments, a meeting can be divided into topic segments based on the meeting content. Segments are assumed to be non-overlapping. In some embodiments, the model can be customized to handle specific kinds of meeting data. For example, in one embodiment, the model can be customized to handle sales meeting data.

In some embodiments, the system takes as input a meeting transcript which contains a list of utterances with timing and speaker information, and the system produces as its output a list of segments, each with a start time, an end time and a topic label. For example, the topic label may include a list of segments such as the list shown in FIG. 4, which will be described in further detail below.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment 100 in which some embodiments may operate. In the exemplary environment 100, a client device 142 is connected to a processing engine 102 and, optionally, a communication platform 140. The processing engine 102 is connected to the communication platform 140, and optionally connected to one or more repositories and/or databases, including, e.g., a transcript repository 130, a model repository 132, and/or a results repository 134. One or more of the databases may be combined or split into multiple databases. The user's client device 142 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
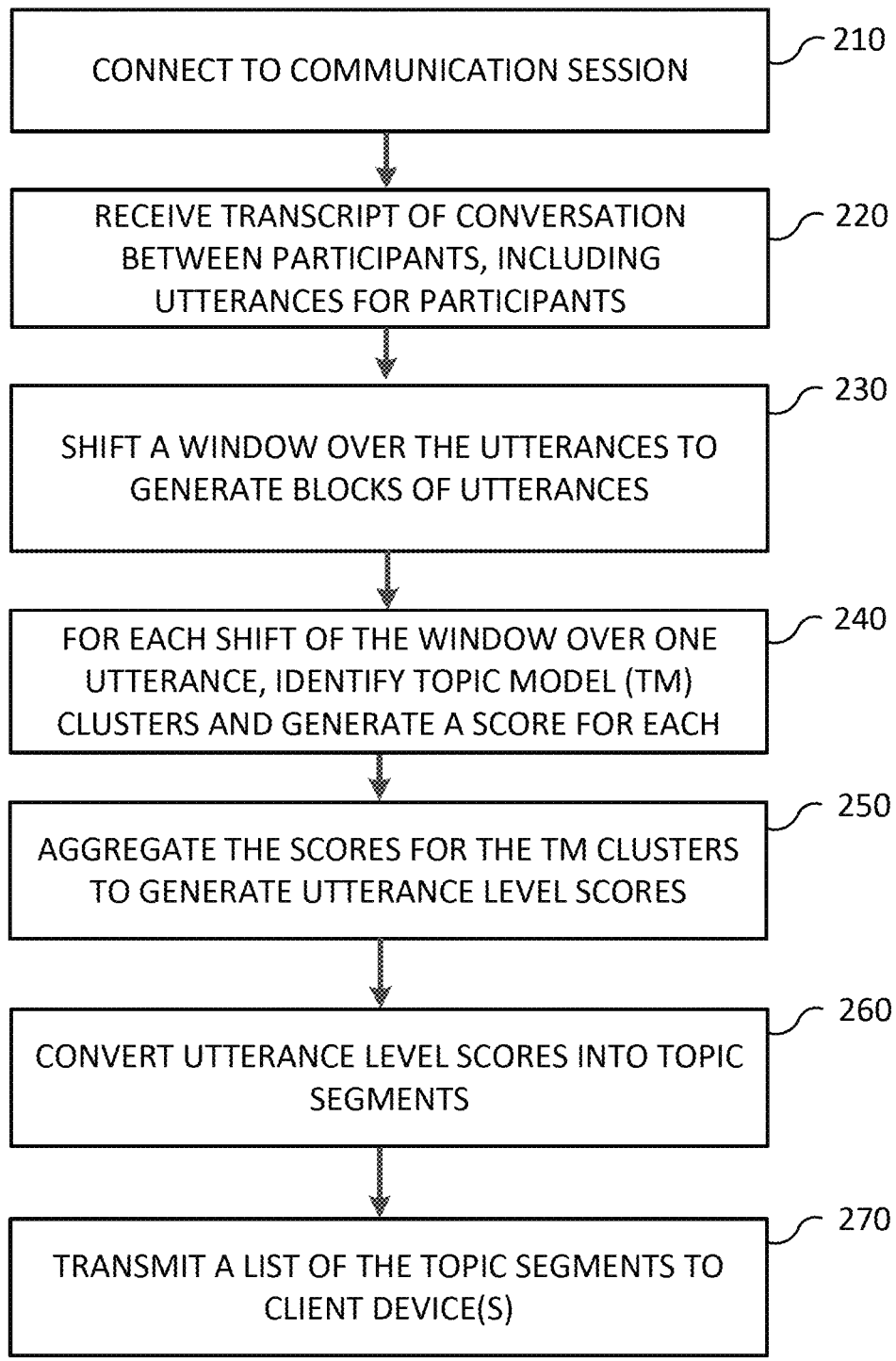
FIG. 2 is a flow chart illustrating an exemplary method that may be performed in some embodiments.

In an embodiment, the processing engine 102 may perform the exemplary method of FIG. 2 or other method herein and, as a result, provide intelligent topic segmentation within a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 142 is a device with a display configured to present information to a user of the device who is a participant of the video communication session. In some embodiments, the client device presents information in the form of a visual UI with multiple selectable UI elements or components. In some embodiments, the client device 142 is configured to send and receive signals and/or information to the processing engine 102 and/or communication platform 140. In some embodiments, the client device 142 is a computing device capable of hosting and executing one or more applications or other programs capable of sending and/or receiving information. In some embodiments, the client device 142 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 142. In some embodiments, one or more of the communication platform 140, processing engine 102, and client device 142 may be the same device. In some embodiments, the user's client device 142 is associated with a first user account within a communication platform, and one or more additional client device(s) may be associated with additional user account(s) within the communication platform.

In some embodiments, optional repositories can include a transcript repository 130, model repository 132, and/or results repository 134. The optional repositories function to store and/or maintain, respectively, a transcript for the communication session; topic models trained from past meeting transcripts; and topic segmentation results for the communication session. The optional database(s) may also store and/or maintain any other suitable information for the processing engine 102 or communication platform 140 to perform elements of the methods and systems herein. In some embodiments, the optional database(s) can be queried by one or more components of the exemplary environment 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communicating with one another by video), or many-to-many (e.g., multiple participants video conferencing with each other in a remote group setting).

Figure 1B:
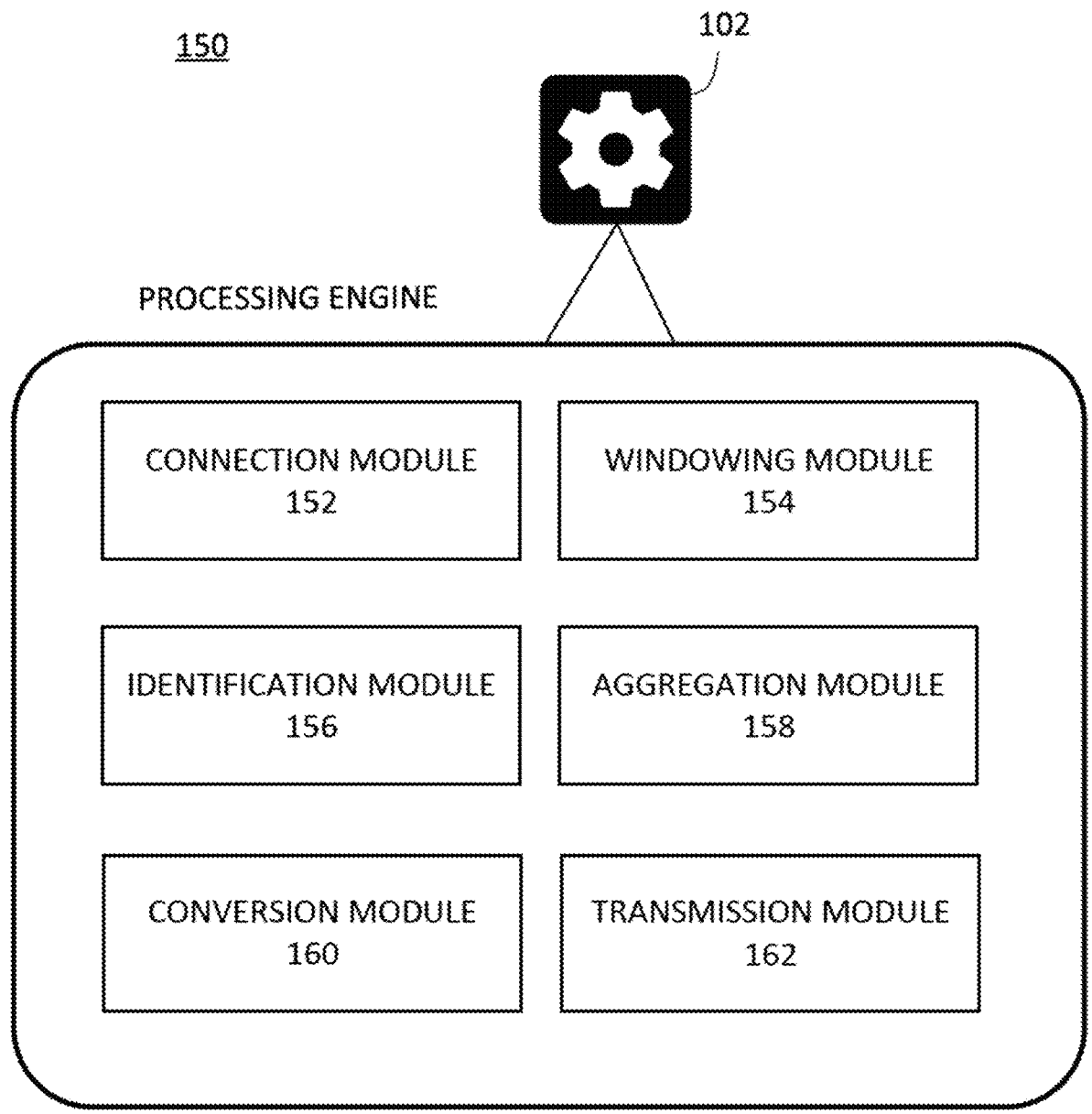
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to connect to a communication session with a number of participants, and to receive a transcript of a conversation between the participants produced during the communication session.

Windowing module 154 functions to shift a window over the utterances to generate a plurality of blocks of utterances, the window having a window size of a prespecified number of utterances and a step size of one utterance.

Identification module 156 functions such that for each shift of the window over one utterance, the system first identifies a number of topic model labels, then generates, via a machine learning ("ML") model, a score for each of the plurality of topic model labels.

Aggregation module 158 functions to aggregate the scores for the topic model labels to generate a number of utterance-level scores.

Conversion module 160 functions to convert the utterance-level scores into topic segments each including a start time, end time, and associated topic model label.

Transmission module 162 functions to transmit, to one or more client devices, a list of the topic segments for the communication session.

The above modules and their functions will be described in further detail in relation to an exemplary method below.

FIG. 2 is a flow chart illustrating an exemplary method that may be performed in some embodiments.

At step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 220, the system receives a transcript of a conversation between the participants produced during the communication session. That is, the conversation which was produced during the communication is used to generate a transcript. The transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session. In some embodiments, automatic speech recognition ("ASR") techniques are used in whole or in part for generating the transcript. In some embodiments, machine learning ("ML") or other artificial intelligence ("AI") models may be used in whole or in part to generate the transcript. In some embodiments, natural language processing ("NLP") techniques may be used in whole or in part to generate the transcript.

At step 230, the system shifts a window over the utterances to generate a number of blocks of utterances. In some embodiments, the window has a window size of a prespecified number of utterances, and a step size of one utterance. In this context, a block of utterances represents utterances which are neighboring each other in time. In one example, the system "windows" the utterances with a window size of 10 utterances, and a step size of 1, which results in a list of blocks of 10 utterances each.

At step 240, for each shift of the window over one utterance, the system identifies topic model clusters ("TM clusters"), and, via an ML model, generates TM cluster scores to assign text labels for each cluster. In some embodiments, the TM cluster scores are used in order to determine a top phrase or top phrasal feature for each topic model cluster, which is then used to assign a text label for that topic model cluster. When the label changes between neighboring windows, a change of topic is potentially identified. The system thus shifts the window one utterance at a time in order to identify potential changes in topic. Every time such a shift is made, a topic model score is generated for that shift and that particular window of utterances. In some embodiments, the system trains or pre-trains an ML model using topic modeling. Topic modeling defines clusters in the feature data space based on a training corpus. Each topic model cluster is assigned a symbolic label, such that it can be referred to by the symbolic label in the implementation. However, this symbolic label is not a real text label. In some embodiments, the topic model clusters are then manually assigned predefined text labels based on their top phrasal features. In some embodiments, this is part of the training process. In some embodiments, during a later inferencing step, the symbolic labels are converted to predefined text labels based on the mapping established during training.

In some embodiments, topic modeling involves clustering blocks of utterances by their feature vector. In some embodiments, the feature vector is extracted using Term Frequency-Inverse Document Frequency ("TF-IDF"). The clustering involves assigning similar blocks to belong to the same cluster. A label is then assigned to each topic model cluster based on the cluster's most significant features. In some embodiments, the assignments are based on the top phrase or top phrasal feature within each topic model cluster.

In some embodiments, at least part of the training of the ML model comprises use of TF-IDF. TF-IDF is used to compute a vector representation for each block, such that it can then be used for topic model clustering. In some embodiments, at least part of the training of the ML model comprises using topic modeling training methods to cluster the utterances into the blocks of utterances, and to then assign labels to the clusters. In various embodiments, topic modeling methods may include one or more of Non-Negative Matrix Factorization ("NMF") and/or Latent Dirichlet Allocation ("LDA").

In some embodiments, prior to training the ML model, the system parses and tags words in the transcript as parts of speech ("POS") within sentences via a pretrained natural language processing ("NLP") model. The training of the ML model is then performed using the parsed and tagged words in the transcript.

In some embodiments, Named Entity Recognition ("NER") is used to find "named entities" and mask them. Named entities are entities that can be denoted with a proper name, including, e.g., persons, locations, organizations, and products. Masking involves replacing those named entities with symbolic representations. NER is a pre-processing step directed to assisting with model generalization.

In some embodiments, via an ML model, the system generates a score for each TM label from each of the blocks of the utterances. In some embodiments, generating the score for each TM label from each of the blocks of the utterances comprises using topic modeling inferencing techniques. In some embodiments, the ML model uses one or more techniques from NMF and/or LDA At step 250, the system aggregates the scores for the TM clusters to generate a number of utterance level scores. In some embodiments, aggregating the scores for the TM clusters to generate the utterance level scores entails, for each utterance: identifying all blocks of utterances that include the current utterance; counting the TM cluster with the highest score from each block of utterances; and generating an utterance level score for the utterance by averaging the counts of the TM clusters with the highest scores.

In some embodiments, the system performs one or more smoothing and/or adjustment operations after the utterance level scores are generated. In some embodiments, one adjustment operation includes assigning an ambiguous TM cluster to a predefined label based on a position of the ambiguous topic segment within the communication session. In some embodiments, one adjustment operation includes assigning an ambiguous TM cluster to a predefined label based on which participant is speaking with the highest frequency during the topic segment. In some embodiments, at least one smoothing operation includes determining that a topic segment does not meet a threshold duration requirement, and then merging the topic segment with one or both of its neighboring topic segments. In some embodiments, at least one adjustment operation includes discounting and removing an utterance level score if it does not meet a threshold value.

In some embodiments, a segment boundary is formed once utterance level labels are generated. The segment boundary allows the system to identify when a change of topic has occurred, i.e., one topic segment changes into another.

At step 260, the system converts the utterance level scores into topic segments each including a start time, end time, and associated text label. In some embodiments, the start time and end time are obtained from timestamps included within the transcript. For example, in some embodiments, the boundaries of each topic segment may be cross-referenced with corresponding timestamps for beginning and ending utterances within that topic segment. In some embodiments, converting the utterance level scores into the topic segments includes grouping utterances of the same level together. In some embodiments, the system ensures that the topic segments are contiguous and non-overlapping, such that there is one, and only one, topic segment associated with each utterance of the transcript, and that utterances in the transcript remain in chronological order from the first topic segment to the last topic segment.

At step 270, the system transmits a list of the topic segments to one or more client devices. In some embodiments, prior to transmitting the list of the topic segments to the client devices, the system formats the list of topic segments into a structured data markup format, such as, e.g., JSON format.

In some embodiments, the communication session is a sales session with one or more prospective customers and one or more members of a sales team. The text labels for topic segments relate to the sales session, and the system identifies each of the participants of the communication session as a prospective customer or a member of the sales team. In some embodiments, predefined text labels all relate to topics for a sales session, and are assigned to TM clusters based on the top phrasal features of the TM clusters. In some embodiments, at least one ambiguous TM cluster is assigned to a different predefined label according to utterances being identified as originating from either a prospective customer or a member of the sales team, pursuant to the above.

In some embodiments, the data is displayed at one or more client devices which are configured to display a UI related to the communication platform and/or communication session. In various embodiments, the one or more client devices may be, e.g., one or more desktop computers, smartphones, laptops, tablets, headsets or other wearable devices configured for virtual reality (VR), augmented reality (AR), or mixed reality, or any other suitable client device for displaying such a UI.

In various embodiments, the client devices may be associated with and/or operated by one or more of: one or more participants of the communication session associated with the organization, one or more administrators or hosts of the communication session, one or more users within an organizational reporting chain of participants of the communication session, and/or one or more authorized users within the organization. In some embodiments, users may be authorized for their client devices to receive a UI presenting data on topic segments f they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

Figure 3:
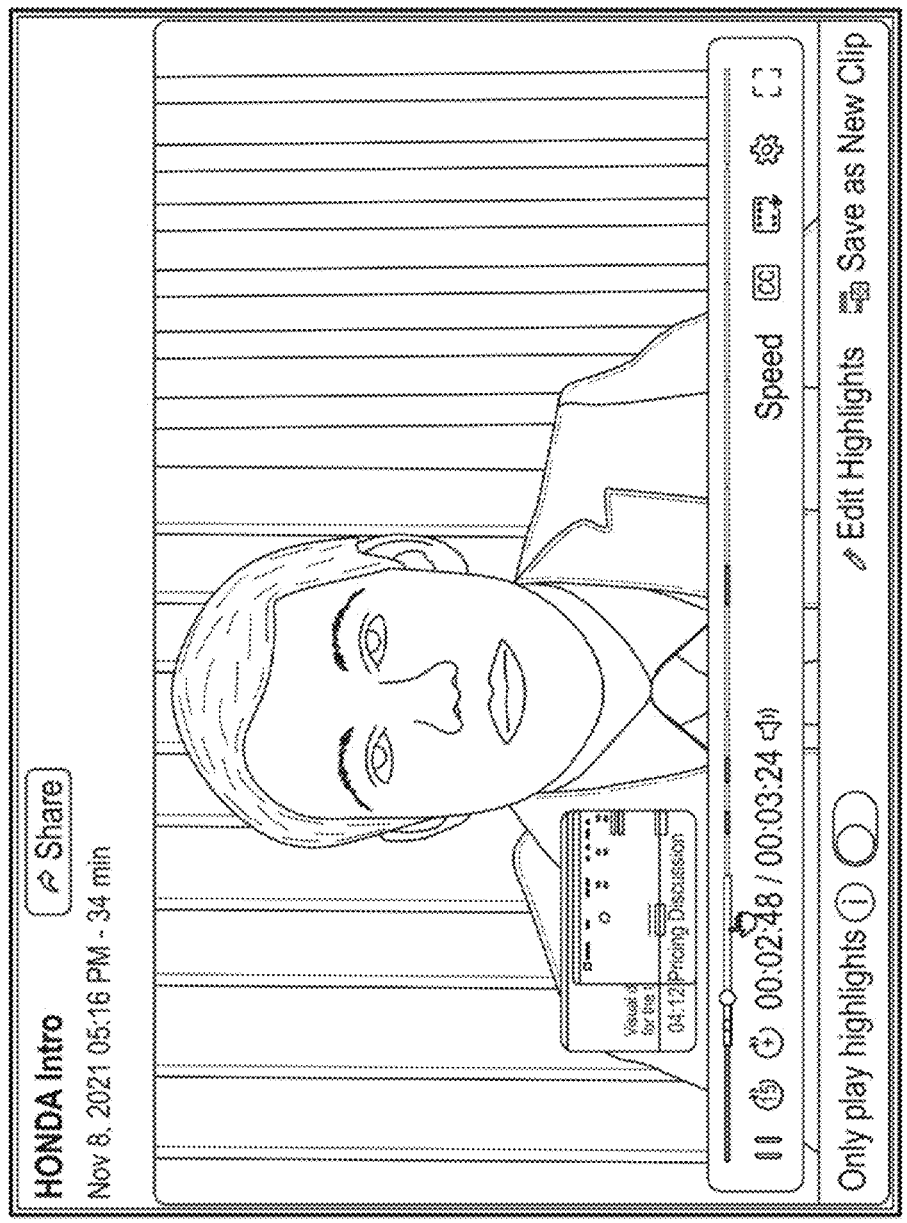
FIG. 3 is a diagram illustrating one example embodiment of a user interface for presenting recorded playback of a communication session separated into different topic segments.

Within this displayed UI presented to the one or more client devices, data corresponding to the extracted topic model labels can be displayed. For example, a UI may be shown which displays aggregate analytics data pertaining to a sales team's meetings with clients over multiple conversations and communication sessions. An example of such a UI displayed to client device(s) is illustrated in FIG. 3 and described in further detail below. In some embodiments, rather than aggregate analytics data or data shown for all team members, individual and/or customized analytics data for a particular participant can be viewed, including potentially a wide variety of data for that particular individual.

Figure 4:
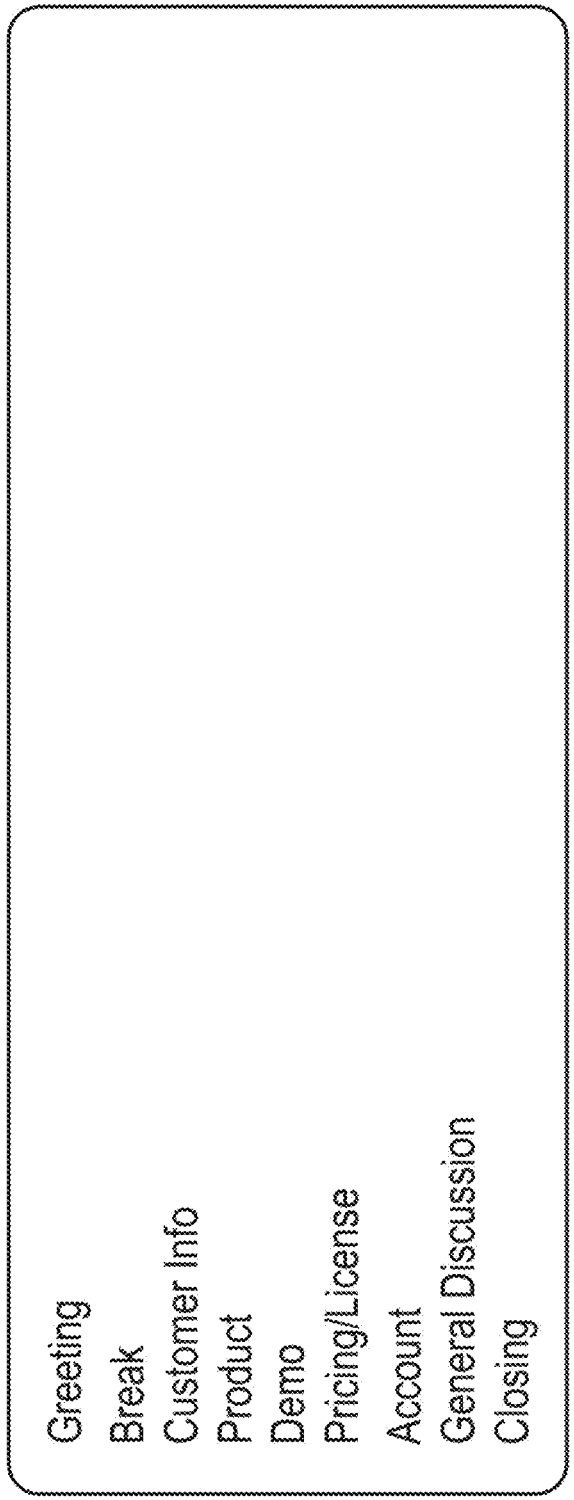
FIG. 4 is a diagram illustrating examples of labels for topic segments.

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, users may be able to view a transcript related to the conversation produced, and instruct the UI to display the topic segments. An example of such a UI is illustrated in FIG. 4, described in further detail below. In some embodiments, a UI element with a playback recording may present one or more pieces of aggregate analytics data or individual analytics data corresponding to the communication session as a whole, the particular topic segment the user is playing back, or any other suitable data which can be presented.

In some embodiments, the system allows, via one or more authorized client devices, modification of one or more of the start time, end time, and associated text label for at least a subset of the topic segments.

FIG. 3 is a diagram illustrating one example embodiment of a user interface for presenting recorded playback of a communication session separated into different topic segments.

Within the illustrated UI, information about a specific recording of a communication session is displayed, including a video of the recording itself which can be played back in various ways or adjusted to skip to different times or topic segments within the video. A timeline allows the user to skip to a different topic segment, and when the user hovers over a topic, a timestamp as well as a topic segment name is displayed.

The topic segments which are shown within this UI and which can be skipped to were pre-generated according to the systems and methods described herein, such as, e.g., FIG. 2 and its accompanying description.

FIG. 4 is a diagram illustrating examples of labels for topic segments.

In the example, such labels include "Greeting", "Break", "Customer Info", "Product", "Demo", "Pricing/License", "Account", "General Discussion", and "Closing". In some embodiments, these labels are determined via the steps for extracting topic labels described above with respect to FIG. 2.

Figure 5:
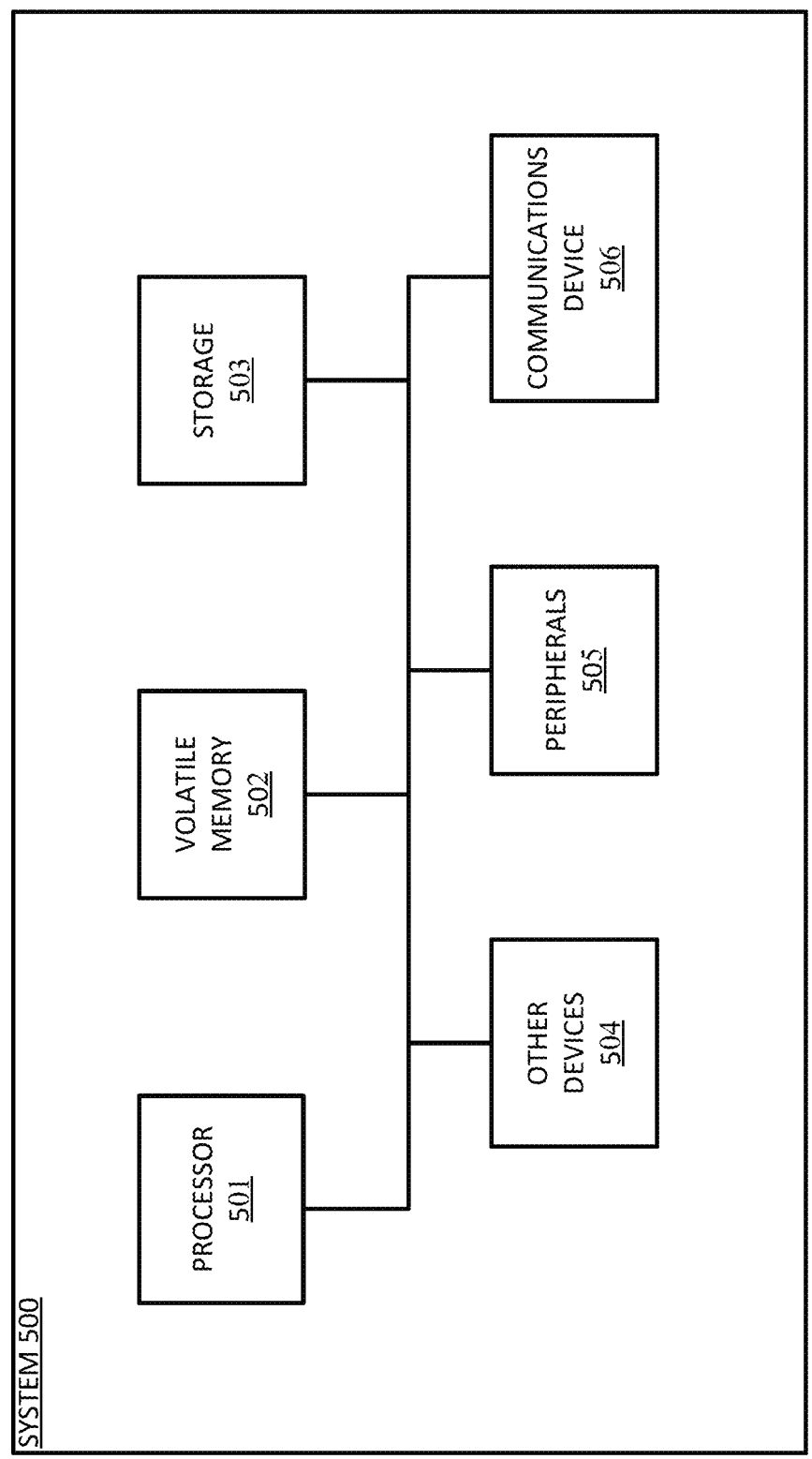
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 500 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1. A method, comprising: connecting to a communication session with a plurality of participants; receiving a transcript of a conversation between the participants produced during the communication session, the transcript comprising timestamps for a plurality of utterances associated with speaking participants; shifting a window over the utterances to generate a plurality of blocks of utterances, the window having a window size of a prespecified number of utterances and a step size of one utterance; for each shift of the window over one utterance: identifying a plurality of topic model (TM) clusters, and generating, via a machine learning (ML) model, TM cluster scores to assign text labels for each TM cluster; aggregating the scores for the TM clusters to generate a plurality of utterance level scores; converting the utterance level scores into topic segments each comprising a start time, end time, and associated text label; and transmitting, to one or more client devices, a list of the topic segments for the communication session.

Example 2. The method of example 1, wherein the text labels for each TM cluster are assigned based on a top phrasal feature of the TM cluster, the top phrasal feature being determined based on the TM cluster score for the TM cluster.

Example 3. The method of any of example 1 or example 2, wherein at least part of the training of the ML model comprises use of Term Frequency-Inverse Document Frequency (TF-IDF) to compute a vector representation for each block of utterances.

Example 4. The method of any of examples 1-3, wherein the text labels are predefined.

Example 5. The method of any of examples 1-4, wherein one or more of Non-Negative Matrix Factorization (NMF) and Latent Dirichlet Allocation (LDA) are used as topic modeling methods.

Example 6. The method of any of examples 1-5, further comprising parsing and tagging words in the transcript as parts of speech (POS) via a pretrained natural language processing (NLP) model, wherein the training of the ML model is performed using the parsed and tagged words in the transcript.

Example 7. The method of any of examples 1-6, wherein Named Entity Recognition (NER) is used to determine one or more named entities and assign symbolic representations to the named entities.

Example 8. The method of any of examples 1-7, wherein generating the score for each TM cluster comprises using topic modeling inferencing techniques.

Example 9. The method of any of examples 1-8, wherein aggregating the score for the TM clusters to generate the plurality of utterance level scores comprises: for each utterance: identifying all blocks of utterances that include the current utterance; counting the TM cluster with the highest score from each block of utterances; and generating an utterance level score for the utterance by averaging the counts of the TM clusters with the highest scores.

Example 10. The method of any of examples 1-9, wherein converting the utterance level scores into the topic segments comprises grouping utterances of the same level together.

Example 11. The method of any of examples 1-10, further comprising performing one or more smoothing and/or adjustment operations after the utterance level scores are generated.

Example 12. The method of example 11, wherein at least one adjustment operation comprises assigning an ambiguous TM cluster to a predefined label based on a position of the ambiguous topic segment within the communication session.

Example 13. The method of example 11, wherein at least one adjustment operation comprises assigning an ambiguous TM cluster to a predefined label based on which participant is speaking with the highest frequency during the topic segment.

Example 14. The method of example 11, wherein at least one smoothing operation comprises: determining that a topic segment does not meet a threshold duration requirement; and merging the topic segment with one or both of its neighboring topic segments.

Example 15. The method of example 11, wherein at least one adjustment operation comprises: discounting and removing an utterance level score if it does not meet a threshold value.

Example 16. The method of any of examples 1-15, further comprising: prior to transmitting the list of the topic segments to the client devices, formatting the list of topic segments into a structured data markup format.

Example 17. The method of any of examples 1-16, wherein: the communication session is a sales session with one or more prospective customers and one or more members of a sales team, and the TM labels and topic segments relate to the sales session, and further comprising: identifying each of the participants of the communication session as a prospective customer or a member of the sales team.

Example 18. The method of any of examples 1-17, wherein the one or more processors are further configured to perform the operation of: allowing, via one or more authorized client devices, modification of one or more of the start time, end time, and associated TM label for at least a subset of the topic segments.

Example 19. A communication system comprising one or more processors configured to perform the operations of: connecting to a communication session with a plurality of participants; receiving a transcript of a conversation between the participants produced during the communication session, the transcript comprising timestamps for a plurality of utterances associated with speaking participants; shifting a window over the utterances to generate a plurality of blocks of utterances, the window having a window size of a prespecified number of utterances and a step size of one utterance; for each shift of the window over one utterance: identifying a plurality of topic model (TM) clusters, and generating, via a machine learning (ML) model, TM cluster scores to assign text labels for each TM cluster; aggregating the scores for the TM clusters to generate a plurality of utterance level scores; converting the utterance level scores into topic segments each comprising a start time, end time, and associated text label; and transmitting, to one or more client devices, a list of the topic segments for the communication session.

Example 20. The communication system of example 19, wherein: the communication session is a sales session with one or more prospective customers and one or more members of a sales team, and the TM labels and topic segments relate to the sales session, and further comprising: identifying each of the participants of the communication session as a prospective customer or a member of the sales team.

Example 21. The communication system of any of example 19 or example 20, wherein the one or more processors are further configured to perform the operation of: allowing, via one or more authorized client devices, modification of one or more of the start time, end time, and associated TM label for at least a subset of the topic segments.

Example 22. The communication system of any of examples 19-21, wherein the text labels for each TM cluster are assigned based on a top phrasal feature of the TM cluster, the top phrasal feature being determined based on the TM cluster score for the TM cluster.

Example 23. The communication system of any of examples 19-22, wherein at least part of the training of the ML model comprises use of Term Frequency-Inverse Document Frequency (TF-IDF) to compute a vector representation for each block of utterances.

Example 24. The communication system of any of examples 19-23, wherein the text labels are predefined.

Example 25. The communication system of any of examples 19-24, wherein one or more of Non-Negative Matrix Factorization (NMF) and Latent Dirichlet Allocation (LDA) are used as topic modeling methods.

Example 26. The communication system of any of examples 19-25, wherein the one or more processors are further configured to perform the operation of parsing and tagging words in the transcript as parts of speech (POS) via a pretrained natural language processing (NLP) model, wherein the training of the ML model is performed using the parsed and tagged words in the transcript.

Example 27. The communication system of any of examples 19-26, wherein Named Entity Recognition (NER) is used to determine one or more named entities and assign symbolic representations to the named entities.

Example 28. The communication system of any of examples 19-27, wherein generating the score for each TM cluster comprises using topic modeling inferencing techniques.

Example 29. The communication system of any of examples 19-28, wherein aggregating the score for the TM clusters to generate the plurality of utterance level scores comprises: for each utterance: identifying all blocks of utterances that include the current utterance; counting the TM cluster with the highest score from each block of utterances; and generating an utterance level score for the utterance by averaging the counts of the TM clusters with the highest scores.

Example 30. The communication system of any of examples 19-29, wherein converting the utterance level scores into the topic segments comprises grouping utterances of the same level together.

Example 31. The communication system of any of examples 19-30, wherein the one or more processors are further configured to perform the operation of performing one or more smoothing and/or adjustment operations after the utterance level scores are generated.

Example 32. The communication system of example 31, wherein at least one adjustment operation comprises assigning an ambiguous TM cluster to a predefined label based on a position of the ambiguous topic segment within the communication session.

Example 33. The communication system of example 31, wherein at least one adjustment operation comprises assigning an ambiguous TM cluster to a predefined label based on which participant is speaking with the highest frequency during the topic segment.

Example 34. The communication system of example 31, wherein at least one smoothing operation comprises: determining that a topic segment does not meet a threshold duration requirement; and merging the topic segment with one or both of its neighboring topic segments.

Example 35. The communication system of example 31, wherein at least one adjustment operation comprises: discounting and removing an utterance level score if it does not meet a threshold value.

Example 36. The communication system of any of examples 19-35, wherein the one or more processors are further configured to perform the operation of: prior to transmitting the list of the topic segments to the client devices, formatting the list of topic segments into a structured data markup format.

Example 37. A non-transitory computer-readable medium containing instructions for generating a note with session content from a communication session, comprising: instructions for connecting to a communication session with a plurality of participants; instructions for receiving a transcript of a conversation between the participants produced during the communication session, the transcript comprising timestamps for a plurality of utterances associated with speaking participants; instructions for shifting a window over the utterances to generate a plurality of blocks of utterances, the window having a window size of a prespecified number of utterances and a step size of one utterance; for each shift of the window over one utterance: instructions for identifying a plurality of topic model (TM) clusters, and instructions for generating, via a machine learning (ML) model, TM cluster scores to assign text labels for each TM cluster; instructions for aggregating the scores for the TM clusters to generate a plurality of utterance level scores; instructions for converting the utterance level scores into topic segments each comprising a start time, end time, and associated text label; and instructions for transmitting, to one or more client devices, a list of the topic segments for the communication session.

Example 38. The non-transitory computer-readable medium of example 37, wherein the text labels for each TM cluster are assigned based on a top phrasal feature of the TM cluster, the top phrasal feature being determined based on the TM cluster score for the TM cluster.

Example 39. The non-transitory computer-readable medium of any of example 37 or example 38, wherein at least part of the training of the ML model comprises use of Term Frequency-Inverse Document Frequency (TF-IDF) to compute a vector representation for each block of utterances.

Example 40. The non-transitory computer-readable medium of any of examples 37-39, wherein the text labels are predefined.

Example 41. The non-transitory computer-readable medium of any of examples 37-40, wherein one or more of Non-Negative Matrix Factorization (NMF) and Latent Dirichlet Allocation (LDA) are used as topic modeling methods.

Example 42. The non-transitory computer-readable medium of any of examples 37-41, further comprising instructions for parsing and tagging words in the transcript as parts of speech (POS) via a pretrained natural language processing (NLP) model, wherein the training of the ML model is performed using the parsed and tagged words in the transcript.

Example 43. The non-transitory computer-readable medium of any of examples 37-42, wherein Named Entity Recognition (NER) is used to determine one or more named entities and assign symbolic representations to the named entities.

Example 44. The non-transitory computer-readable medium of any of examples 37-43, wherein generating the score for each TM cluster comprises using topic modeling inferencing techniques.

Example 45. The non-transitory computer-readable medium of any of examples 37-44, wherein aggregating the score for the TM clusters to generate the plurality of utterance level scores comprises: for each utterance: identifying all blocks of utterances that include the current utterance; counting the TM cluster with the highest score from each block of utterances; and generating an utterance level score for the utterance by averaging the counts of the TM clusters with the highest scores.

Example 46. The non-transitory computer-readable medium of any of examples 37-45, wherein converting the utterance level scores into the topic segments comprises grouping utterances of the same level together.

Example 47. The non-transitory computer-readable medium of any of examples 37-46, further comprising instructions for performing one or more smoothing and/or adjustment operations after the utterance level scores are generated.

Example 48. The non-transitory computer-readable medium of example 47, wherein at least one adjustment operation comprises assigning an ambiguous TM cluster to a predefined label based on a position of the ambiguous topic segment within the communication session.

Example 49. The non-transitory computer-readable medium of example 47, wherein at least one adjustment operation comprises assigning an ambiguous TM cluster to a predefined label based on which participant is speaking with the highest frequency during the topic segment.

Example 50. The non-transitory computer-readable medium of example 47, wherein at least one smoothing operation comprises: determining that a topic segment does not meet a threshold duration requirement; and merging the topic segment with one or both of its neighboring topic segments.

Example 51. The non-transitory computer-readable medium of example 47, wherein at least one adjustment operation comprises: discounting and removing an utterance level score if it does not meet a threshold value.

Example 52. The non-transitory computer-readable medium of any of examples 37-51, further comprising: prior to transmitting the list of the topic segments to the client devices, instructions for formatting the list of topic segments into a structured data markup format.

Example 53. The non-transitory computer-readable medium of any of examples 37-52, wherein: the communication session is a sales session with one or more prospective customers and one or more members of a sales team, and the TM labels and topic segments relate to the sales session, and further comprising: identifying each of the participants of the communication session as a prospective customer or a member of the sales team.

Example 54. The non-transitory computer-readable medium of any of examples 37-53, wherein the one or more processors are further configured to perform the operation of: allowing, via one or more authorized client devices, modification of one or more of the start time, end time, and associated TM label for at least a subset of the topic segments.

Example 55. A method, comprising: connecting, by a server-side processing system, to a communication session including one or more client devices hosted on a network; receiving, by the server-side processing system, a plurality of utterances captured by the one or more client devices and associated with speaking participants of the communication session;

generating, by the server-side processing system, a transcript including the plurality of utterances captured by the one or more client devices, the transcript comprising, for the plurality of utterances, indications of a speaking participant and timestamps; obtaining, by the server-side processing system, a machine learning (ML) model trained using topic modeling, wherein topic modeling defines topic model (TM) clusters in the communication session based on a training corpus comprising transcripts of past communication sessions; using, by the server-side processing system, the ML model to generate a plurality of blocks of utterances by shifting a window over the plurality of utterances, the window having a window size of a prespecified number of utterances and a step size of one utterance; for each shift of the window over one utterance: identifying a plurality of TM clusters; and generating, via the ML model, TM cluster scores to assign text labels for each TM cluster; aggregating, by the server-side processing system, the TM cluster scores to generate a plurality of utterance level scores; associating, by the server-side processing system, each utterance level score with a corresponding timestamp; generating, by the server-side processing system based on the utterance level scores that exceed a threshold value, topic segments each comprising a start time, end time, and associated text label, the start time and the end time being determined based on corresponding timestamps of the utterance level scores; and transmitting, by the server-side processing system to a client device of the one or more client devices based on a permission level associated with the client device, a list of the topic segments for the communication session.

Example 56. The method of example 55, wherein the text labels for each TM cluster are assigned based on a top phrasal feature of the TM cluster, the top phrasal feature being determined based on the TM cluster score for the TM cluster.

Example 57. The method of example 55 or example 56, wherein the ML model is trained with Term Frequency-Inverse Document Frequency (TF-IDF) to compute a vector representation for each block of utterances.

Example 58. The method of any of examples 55-57, wherein the text labels are predefined.

Example 59. The method of any of examples 55-58, wherein one or more of Non-Negative Matrix Factorization (NMF) and Latent Dirichlet Allocation (LDA) are used as topic modeling methods.

Example 60. The method of any of examples 55-59, further comprising parsing and tagging words in the transcript as parts of speech (POS) via a pretrained natural language processing (NLP) model; and training the ML model using the parsed and tagged words in the transcript.

Example 61. The method of any of examples 55-60, wherein Named Entity Recognition (NER) is used to determine one or more named entities and assign symbolic representations to the named entities.

Example 62. The method of any of examples 55-61, wherein generating the TM cluster scores comprises using topic modeling inferencing techniques.

Example 63. The method of any of examples 55-62, wherein aggregating the TM cluster scores to generate the plurality of utterance level scores comprises: for each utterance: identifying blocks of utterances that include a current utterance; identifying a TM cluster with a highest score from each block of utterances to generate a set of TM clusters; and generating an utterance level score for the utterance based on the TM cluster scores of the generated set of TM clusters.

Example 64. The method of any of examples 55-63, wherein generating the topic segments comprises grouping utterances of a same level together.

Example 65. The method of any of examples 55-64, further comprising performing one or more smoothing and/or adjustment operations after the utterance level scores are generated.

Example 66. The method of example 65, wherein at least one adjustment operation comprises assigning an ambiguous TM cluster to a predefined label based on a position of a topic segment within the communication session.

Example 67. The method of example 65, wherein at least one adjustment operation comprises assigning a TM cluster to a predefined label based on which participant is speaking with a highest frequency.

Example 68. The method of example 65, wherein at least one smoothing operation comprises: determining that a topic segment does not meet a threshold duration requirement; and merging the topic segment with one or both of its neighboring topic segments.

Example 69. The method of example 65, wherein at least one adjustment operation comprises: discounting and removing an utterance level score if it does not meet a threshold value.

Example 70. The method of any of examples 55-69, further comprising: prior to transmitting the list of the topic segments to the client devices, formatting the list of topic segments into a structured data markup format.

Example 71. A server-side communication system comprising one or more processors configured to perform operations of: connecting to a communication session including one or more client devices hosted on a network; receiving a plurality of utterances captured by the one or more client devices and associated with speaking participants of the communication session; generating a transcript including the plurality of utterances captured by the one or more client devices, the transcript comprising, for the plurality of utterances, indications of a speaking participant and timestamps; obtaining a machine learning (ML) model trained using topic modeling, wherein topic modeling defines topic model (TM) clusters in the communication session based on a training corpus comprising transcripts of past communication sessions; training a machine learning (ML) model using topic modeling, wherein topic modeling defines topic model (TM) clusters in the communication session based on a training corpus comprising transcripts of past communication sessions; using the ML model to generate a plurality of blocks of utterances by shifting a window over the plurality of utterances, the window having a window size of a prespecified number of utterances and a step size of one utterance; for each shift of the window over one utterance: identifying a plurality of TM clusters; and generating, via the ML model, TM cluster scores to assign text labels for each TM cluster; aggregating the TM cluster scores to generate a plurality of utterance level scores; associating each utterance level score with a corresponding timestamp; generating, based on the utterance level scores that exceed a threshold value, topic segments each comprising a start time, end time, and associated text label, the start time and the end time being determined based on corresponding timestamps of the utterance level scores; and transmitting, to a client device of the one or more client devices based on a permission level associated with the client device, a list of the topic segments for the communication session.

Example 72. The server-side communication system of example 71, wherein: the communication session is a sales session with one or more prospective customers and one or more members of a sales team, and the text labels for each TM cluster and topic segments relate to the sales session, and further comprising: identifying each participant of the communication session as a prospective customer or a member of the sales team.

Example 73. The server-side communication system of example 71 or example 72, wherein the one or more processors are further configured to perform an operation of: allowing, via one or more authorized client devices, modification of one or more of the start time, end time, and associated TM label for at least a subset of the topic segments.

Example 74. A non-transitory computer-readable medium storing instructions which, when executed by one or more computers, cause the one or more computers to perform operations comprising: connecting, by a server-side processing system, to a communication session including one or more client devices hosted on a network; receiving, by the server-side processing system, a plurality of utterances captured by the one or more client devices and associated with speaking participants of the communication session; generating, by the server-side processing system, a transcript including the plurality of utterances captured by the one or more client devices, the transcript comprising, for the plurality of utterances, indications of a speaking participant and timestamps; obtaining, by the server-side processing system, a machine learning (ML) model trained using topic modeling, wherein topic modeling defines topic model (TM) clusters in the communication session based on a training corpus comprising transcripts of past communication sessions; using, by the server-side processing system, the ML model to generate a plurality of blocks of utterances by shifting a window over the plurality of utterances, the window having a window size of a prespecified number of utterances and a step size of one utterance; for each shift of the window over one utterance: identifying a plurality of TM clusters; and generating, via the ML model, TM cluster scores to assign text labels for each TM cluster; aggregating, by the server-side processing system, the TM cluster scores to generate a plurality of utterance level scores; associating, by the server-side processing system, each utterance level score with a corresponding timestamp; generating, by the server-side processing system based on the utterance level scores that exceed a threshold value, topic segments each comprising a start time, end time, and associated text label, the start time and the end time being determined based on corresponding timestamps of the utterance level scores; and transmitting, by the server-side processing system to a client device of the one or more client devices based on a permission level associated with the client device, a list of the topic segments for the communication session.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
connecting, by a server-side processing system, to a communication session including one or more client devices hosted on a network;
receiving, by the server-side processing system, a plurality of utterances captured by the one or more client devices and associated with speaking participants of the communication session;
generating, by the server-side processing system, a transcript including the plurality of utterances captured by the one or more client devices, the transcript comprising, for the plurality of utterances, indications of a speaking participant and timestamps;
obtaining, by the server-side processing system, a machine learning (ML) model trained using topic modeling, wherein topic modeling defines topic model (TM) clusters in the communication session based on a training corpus comprising transcripts of past communication sessions;
using, by the server-side processing system, the ML model to generate a plurality of blocks of utterances by shifting a window over the plurality of utterances, the window having a window size of a prespecified number of utterances and a step size of one utterance;
for each shift of the window over one utterance:
identifying a plurality of TM clusters; and
generating, via the ML model, TM cluster scores to assign text labels for each TM cluster;
aggregating, by the server-side processing system, the TM cluster scores to generate a plurality of utterance level scores;
associating, by the server-side processing system, each utterance level score with a corresponding timestamp;
generating, by the server-side processing system based on the utterance level scores that exceed a threshold value, topic segments each comprising a start time, end time, and associated text label, the start time and the end time being determined based on corresponding timestamps of the utterance level scores; and
transmitting, by the server-side processing system to a client device of the one or more client devices based on a permission level associated with the client device, a list of the topic segments for the communication session.

2. The method of claim 1, wherein the text labels for each TM cluster are assigned based on a top phrasal feature of the TM cluster, the top phrasal feature being determined based on the TM cluster score for the TM cluster.

3. The method of claim 1, wherein the ML model is trained with Term Frequency-Inverse Document Frequency (TF-IDF) to compute a vector representation for each block of utterances.

4. The method of claim 1, wherein the text labels are predefined.

5. The method of claim 1, wherein one or more of Non-Negative Matrix Factorization (NMF) and Latent Dirichlet Allocation (LDA) are used as topic modeling methods.

6. The method of claim 1, further comprising parsing and tagging words in the transcript as parts of speech (POS) via a pretrained natural language processing (NLP) model; and
training the ML model using the parsed and tagged words in the transcript.

7. The method of claim 1, wherein Named Entity Recognition (NER) is used to determine one or more named entities and assign symbolic representations to the named entities.

8. The method of claim 1, wherein generating the TM cluster scores comprises using topic modeling inferencing techniques.

9. The method of claim 1, wherein aggregating the TM cluster scores to generate the plurality of utterance level scores comprises:
for each utterance:
identifying blocks of utterances that include a current utterance;
identifying a TM cluster with a highest score from each block of utterances to generate a set of TM clusters; and
generating an utterance level score for the utterance based on the TM cluster scores of the generated set of TM clusters.

10. The method of claim 1, wherein generating the topic segments comprises grouping utterances of a same level together.

11. The method of claim 1, further comprising performing one or more smoothing and/or adjustment operations after the utterance level scores are generated.

12. The method of claim 11, wherein at least one adjustment operation comprises assigning an ambiguous TM cluster to a predefined label based on a position of a topic segment within the communication session.

13. The method of claim 11, wherein at least one adjustment operation comprises assigning a TM cluster to a predefined label based on which participant is speaking with a highest frequency.

14. The method of claim 11, wherein at least one smoothing operation comprises:
determining that a topic segment does not meet a threshold duration requirement; and
merging the topic segment with one or both of its neighboring topic segments.

15. The method of claim 11, wherein at least one adjustment operation comprises:
discounting and removing an utterance level score if it does not meet a threshold value.

16. The method of claim 1, further comprising:
prior to transmitting the list of the topic segments to the client devices, formatting the list of topic segments into a structured data markup format.

17. A server-side communication system comprising one or more processors configured to perform operations of:
connecting to a communication session including one or more client devices hosted on a network;
receiving a plurality of utterances captured by the one or more client devices and associated with speaking participants of the communication session;
generating a transcript including the plurality of utterances captured by the one or more client devices, the transcript comprising, for the plurality of utterances, indications of a speaking participant and timestamps;
obtaining a machine learning (ML) model trained using topic modeling, wherein topic modeling defines topic model (TM) clusters in the communication session based on a training corpus comprising transcripts of past communication sessions;
training a machine learning (ML) model using topic modeling, wherein topic modeling defines topic model (TM) clusters in the communication session based on a training corpus comprising transcripts of past communication sessions;
using the ML model to generate a plurality of blocks of utterances by shifting a window over the plurality of utterances, the window having a window size of a prespecified number of utterances and a step size of one utterance;
for each shift of the window over one utterance:
identifying a plurality of TM clusters; and
generating, via the ML model, TM cluster scores to assign text labels for each TM cluster;
aggregating the TM cluster scores to generate a plurality of utterance level scores;
associating each utterance level score with a corresponding timestamp;
generating, based on the utterance level scores that exceed a threshold value, topic segments each comprising a start time, end time, and associated text label, the start time and the end time being determined based on corresponding timestamps of the utterance level scores; and
transmitting, to a client device of the one or more client devices based on a permission level associated with the client device, a list of the topic segments for the communication session.

18. The server-side communication system of claim 17, wherein:
the communication session is a sales session with one or more prospective customers and one or more members of a sales team, and
the text labels for each TM cluster and topic segments relate to the sales session, and further comprising:
identifying each of the participants of the communication session as a prospective customer or a member of the sales team.

19. The server-side communication system of claim 17, wherein the one or more processors are further configured to perform an operation of:
allowing, via one or more authorized client devices, modification of one or more of the start time, end time, and associated TM label for at least a subset of the topic segments.

20. A non-transitory computer-readable medium storing instructions which, when executed by one or more computers, cause the one or more computers to perform operations comprising:
- connecting, by a server-side processing system, to a communication session including one or more client devices hosted on a network;
- receiving, by the server-side processing system, a plurality of utterances captured by the one or more client devices and associated with speaking participants of the communication session;
- generating, by the server-side processing system, a transcript including the plurality of utterances captured by the one or more client devices, the transcript comprising, for the plurality of utterances, indications of a speaking participant and timestamps;
- obtaining, by the server-side processing system, a machine learning (ML) model trained using topic modeling, wherein topic modeling defines topic model (TM) clusters in the communication session based on a training corpus comprising transcripts of past communication sessions;
- using, by the server-side processing system, the ML model to generate a plurality of blocks of utterances by shifting a window over the plurality of utterances, the window having a window size of a prespecified number of utterances and a step size of one utterance;
- for each shift of the window over one utterance:
  - identifying a plurality of TM clusters; and
  - generating, via the ML model, TM cluster scores to assign text labels for each TM cluster;
- aggregating, by the server-side processing system, the TM cluster scores to generate a plurality of utterance level scores;
- associating, by the server-side processing system, each utterance level score with a corresponding timestamp;
- generating, by the server-side processing system based on the utterance level scores that exceed a threshold value, topic segments each comprising a start time, end time, and associated text label, the start time and the end time being determined based on corresponding timestamps of the utterance level scores; and
- transmitting, by the server-side processing system to a client device of the one or more client devices based on a permission level associated with the client device, a list of the topic segments for the communication session.

* * * * *